(12) United States Patent
Kulchytskyy et al.

(10) Patent No.: US 11,113,070 B1
(45) Date of Patent: Sep. 7, 2021

(54) AUTOMATED IDENTIFICATION AND DISABLEMENT OF SYSTEM DEVICES IN A COMPUTING SYSTEM

(71) Applicant: AMERICAN MEGATRENDS INTERNATIONAL, LLC, Norcross, GA (US)

(72) Inventors: Igor Kulchytskyy, Lawrenceville, GA (US); Manickavasakam Karpagavinayagam, Norcross, GA (US); Viswanathan Swaminathan, Bothell, WA (US); Chandrasekar Rathineswaran, Cumming, GA (US)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 197 days.

(21) Appl. No.: 16/528,503

(22) Filed: Jul. 31, 2019

(51) Int. Cl.
*G06F 9/00* (2006.01)
*G06F 15/177* (2006.01)
*G06F 9/4401* (2018.01)
*G06F 9/445* (2018.01)

(52) U.S. Cl.
CPC ........ *G06F 9/4401* (2013.01); *G06F 9/44505* (2013.01)

(58) Field of Classification Search
CPC ............................ G06F 9/4401; G06F 9/44505
See application file for complete search history.

(56) References Cited

U.S. PATENT DOCUMENTS

| 8,621,118 | B1* | 12/2013 | Nulkar | G06F 11/0778 |
| | | | | 710/15 |
| 2007/0234124 | A1* | 10/2007 | Chen | G06F 9/44505 |
| | | | | 714/36 |
| 2016/0359967 | A1* | 12/2016 | Garces-Erice | H04W 4/08 |

* cited by examiner

*Primary Examiner* — Nitin C Patel
(74) *Attorney, Agent, or Firm* — Newport IP LLC; Leonard J. Hope

(57) ABSTRACT

Technologies are provided for automated identification of system devices to be disabled in a computing system and the disablement of the system devices during bootup of the computing system. In some embodiments, the computing system can execute a firmware configured to perform a bootup process of the computing system. The computing system includes multiple system devices. The firmware can generate program code for identifying a system device for disablement. The firmware can send the program code to a controller device curing the bootup process, where execution of the program code by the controller device generates data identifying one or several specific system devices to be disabled in the computing system. The firmware can then access such data from the controller device. Using the data, the firmware can determine that a specific system device to be disabled. The firmware can then disable that particular system device on a next bootup process.

25 Claims, 6 Drawing Sheets

US 11,113,070 B1

AUTOMATED IDENTIFICATION AND DISABLEMENT OF SYSTEM DEVICES IN A COMPUTING SYSTEM

BACKGROUND

Scalability in today's data centers is increasingly achieved with horizontal, scale-out solutions, which often include large quantities of simple servers. The usage model of scale-out hardware is, however, drastically different than that of traditional enterprise platforms and, therefore, requires a new approach to platform management.

In order to enable platform management in large server installations, such as those described above, managed computer systems commonly include a baseboard management controller (BMC). The BMC constitutes a side-band structure of the computing system, to manage aspects of the operation of a computing system. The BMC can be embodied in a specialized service processor that can monitor the physical state of a computer, network server, or other hardware device using sensors, and can communicate with a system administrator device by means of an out-of-band (OOB) network connection.

Commonly deployed BMCs can provide numerous functionalities, such as monitoring health-related aspects associated with a host computing device. More specifically, a BMC can monitor the temperature of one or many components of the host computing device; speed of rotational components within the host computing device; the voltage across or applied to one or more components within the host computing device; the available and/or used capacity of memory devices within the host computing device; a combination of the foregoing; or the like.

There are situations in data centers, however, that may require to remotely disable system devices, such as a peripheral component interconnect express (PCIe) devices, dual in-line memory modules (DIMMs), or central processing units (CPUs), that are present in servers of a data center. Those situations can include failure of a system device, reconfiguration of a server device, or similar. Commonly deployed BMCs generally fail to provide functionality that permits managing the disablement of systems devices remotely, even when modern manageability interfaces are utilized.

Therefore, several technical challenges remain to be addressed in the remote disablement of system devices of a computing system that hosts a BMC or a similar controller device.

SUMMARY

Technologies disclosed herein permit automatically identifying system devices for disablement in a computing system, and disabling the system devices during bootup of the computing system. The disclosed technologies leverage a BMC to receive requests to disable particular system devices and supply those requests to firmware present in the computing system. The requests can be received, for example, from an end-user or host computing device. The that end, the functionality of the BMC can be extended by providing program code, by the firmware, to the BMC during execution of a bootup process of the computing system. The program code defines a procedure to identify a system device for disablement based on a request from an end-user or host computing device. Extending the functionality of the BMC in this fashion avoids relying on BMC firmware source build even when the program code is modified at the firmware.

The BMC can execute the program code to identify a particular system device to disable. The program code can be executed in response to receiving a request at the BMC to disable the particular system device. Such a request can be received by means of OOB communication and identifies the particular system device. Execution of the program code can result in data uniquely identifying the system device and configured for communication to the firmware. The data can be retained within the BMC.

During execution of a next bootup process of the computing system, the firmware can send, to the BMC, a request to identify system devices for disablement. To that, the firmware can send an Intelligent Platform Management Interface (IPMI) command including payload data defining such a request. The BMC can receive the IPMI command and can send an IPMI response to the firmware, where the IPMI response includes payload data defining the particular system device to be disabled. The IPMI protocol is a set of computer interface specifications for autonomous computer systems, like BMCs, that provide monitoring capabilities independently of a processor, firmware, and operating system of a host computing system.

By sending such an IPMI response, not only does the BMC identify the particular device to be disabled, but the BMC effectively transfers to the firmware the request to disable the particular device that has been received at the BMC. To that point, using the payload data included in the IPMI response, the firmware can determine that the particular system device is to be disabled. The firmware can then disable that particular system device.

This Summary is provided to introduce a selection of the technologies disclosed herein in a simplified form that are described in greater detail below in the Detailed Description. This Summary is not intended to identify key elements or essential elements of the claimed subject matter, nor is it intended that this Summary be used to limit the scope of the claimed subject matter. Furthermore, the claimed subject matter is not limited to embodiments or implementations thereof that solve any or all disadvantages noted in any part of this disclosure.

BRIEF DESCRIPTION OF THE DRAWINGS

The annexed drawings are an integral part of the disclosure and are incorporated into the present specification. The drawings illustrate examples of embodiments of the disclosure and, in conjunction with the description and claims, serve to explain, at least in part, various principles, features, or aspects of the disclosure. Some embodiments of the disclosure are described more fully below with reference to the drawings. However, various aspects and elements of the disclosure can be implemented in many different forms and should not be construed as being limited to the implementations set forth herein. Like numbers refer to like, but not necessarily the same or identical, elements throughout. The accompanying drawings can be briefly characterized as follows:

DETAILED DESCRIPTION

The disclosure recognizes and addresses, amongst other technical challenges, the issue of remotely disabling a system device present in a computing system managed by means of a BMC. Embodiments of the disclosed technologies expand the functionality of the BMC in order to permit receiving a request to disable a system device (a CPU, a DIMM, a PCIe device, etc.) and marking the system device for disablement. Data identifying a marked system device can be supplied to the firmware of the computing system to disable the system device.

The implementation of the technologies disclosed herein can result in the expansion of the functionality of a typical BMC to identify system devices to be disabled in a computing system, which can permit a firmware of the computing system to disable those system devices remotely. Such an expansion is accomplished without requiring changes to the structure of the BMC or the protocol(s) utilized by the BMC, or both. Other technical benefits not specifically mentioned herein can also be realized through implementations of the disclosed subject matter.

The subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Aspects and/or elements of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, wearable devices, special-purpose hardware devices, network appliances, and the like.

The configurations described herein can be practiced in distributed computing environments, where tasks can be performed by remote computing devices that are linked or otherwise communicative coupled via a communications network. In a distributed computing environment, program modules can be located in both local and remote memory storage devices.

Figure 1:
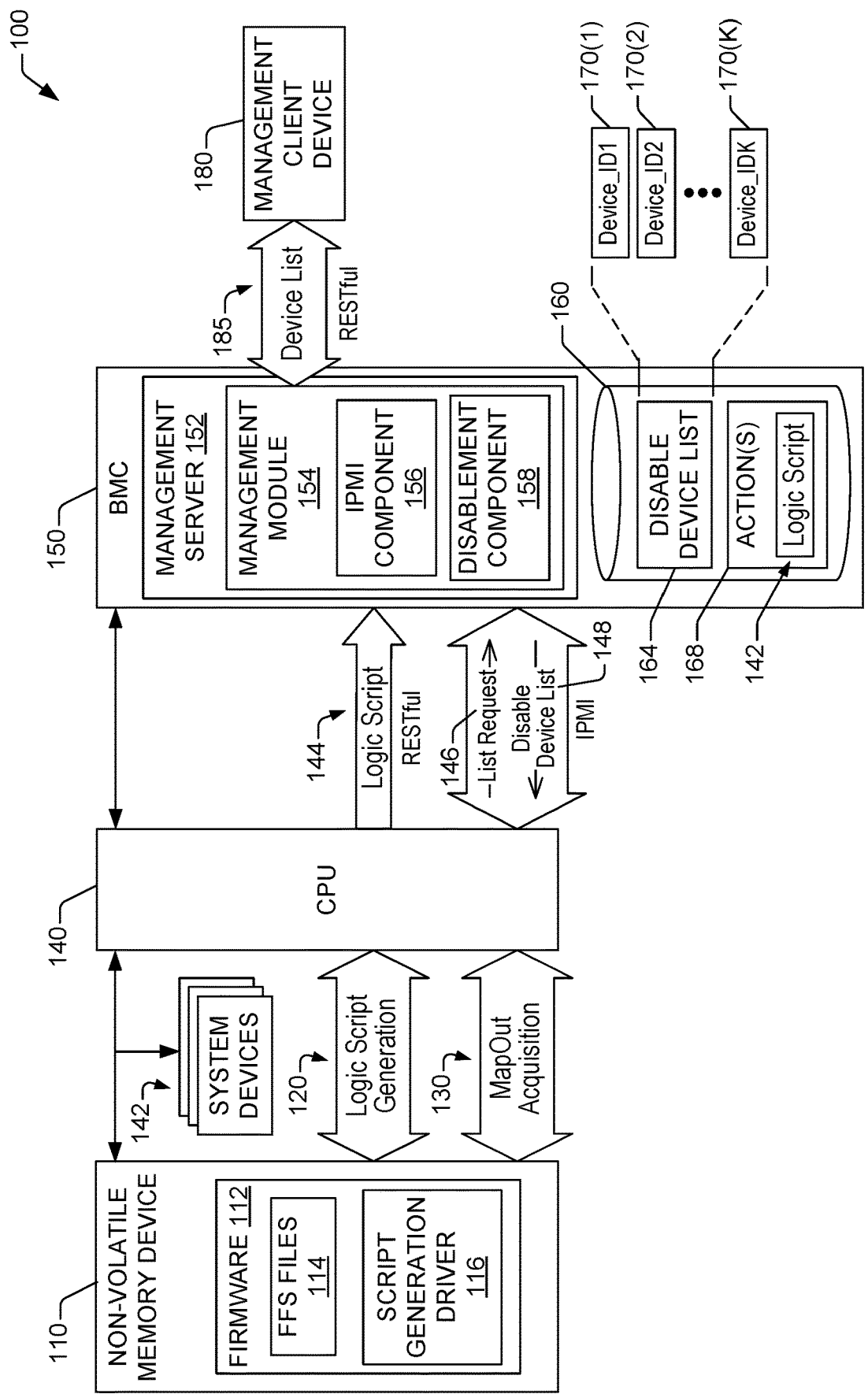
FIG. 1 illustrates an example of a computing system for automated identification of system devices of a computing system and disablement of the system devices during bootup of the computing system, in accordance with one or more embodiments of this disclosure.

With reference to the drawings, FIG. 1 is a schematic block diagram of an example of a computing system 100 configured for automated identification of system devices to be disabled and the disablement of the system devices during bootup, in accordance with one or more embodiments of this disclosure. The exemplified computing system 100 includes a non-volatile memory device 110 (e.g., a flash memory device) having encoded thereon a firmware 112. The firmware 112 includes device-accessible instructions and device-readable data configured to perform a bootup process of the exemplified computing system 100. The device-accessible instructions can be read and executed by one or many processors functionally coupled to the non-volatile memory device 110. Execution of the device-accessible instructions can cause the processor(s) to perform the bootup process and provide firmware functionality described herein.

In some embodiments, the firmware 112 can be implemented to be compliant with the UEFI Specification. More specifically, the firmware 112 can include FFS files 114. The FFS files 114 can be configured when providing the firmware 112 on the non-volatile memory device 110 during build-time of the computing system 100. The FFS files 114 can be arranged in one or many firmware volumes (FVs; not depicted in FIG. 1). The firmware 112 can include other types of firmware components in addition to, or instead of, FFS files 114.

Other types of firmware besides firmware compliant with the UEFI specification can be utilized in some embodiments. Additional details regarding the configuration and operation of the firmware 112 in one embodiment are provided herein with respect to FIG. 5.

The firmware 112 also includes a script generation driver 116 that can compose program code that defines a particular functionality. In one example, the program code can define a procedure to identify a system device for disablement. The system device can be embodied in, for example, a CPU, a DIMM, a PCIe, or similar. The script generation driver 116 can compose additional or different program code that provides other functionality besides identifying system devices for disablement. Regardless of the particular functionality, the program code can be configured, at least partially, using defined semantics of a hypermedia representational state transfer (REST) interface.

In some configurations, the hypermedia REST interface can be compliant with the REDFISH specification. As such, the procedure can correspond to a REDFISH-compliant action. REDFISH is a successor to previous manageability interfaces created by the Distributed Management Task Force (DMTF). REDFISH is an open industry standard specification and schema for simple, modern, and secure management of scalable platform hardware, such as server computers located in data centers, cloud computing environments, or the like. The REDFISH specification and schema specifies a REST interface and utilizes JSON and open data protocol (OData) to integrate management solutions within existing toolchains, for example. The technologies disclosed herein are, of course, not limited to utilizing a REDFISH-compatible interface.

OData is a protocol that permits the creation and consumption of REST application programming interfaces (APIs), which allow web clients to publish and edit resources using simple hypertext transfer protocol (HTTP) messages. The resources are identified using uniform resource locators (URLs) and are defined in a data model. Therefore, OData permits querying and updating data using core protocols (such as HTTP) and RESTful interfaces. OData includes services, and various libraries and tools are available to consume such services. In addition, OData permits or otherwise facilitates interoperability between disparate data sources, applications, services, and clients. OData is standardized at the Organization for the Advancement of Structured Information Standards (OASIS), and the standard is currently approved by the International Organization for Standardization (ISO) and the International Electrotechnical Commission (IEC).

The program code composed by the script generation driver 116 can be embodied in, for example, a script defining logic to identify one or many system devices for disablement. The script can be configured, at least partially, using defined semantics of a hypermedia REST interface, such as a REDFISH-compliant interface. The script can be embodied in, for example, a Lua script, a Python script, a Perl script, a secure shell (SSH) script, or similar.

To boot the exemplified computing system 100 and provide firmware functionality according to this disclosure, amongst other functionalities, the exemplified computer system 100 includes a central processing unit (CPU) 140 that can execute the firmware 110. The CPU 140 is functionally coupled to the non-volatile memory device 110 and includes one or many processors, each having at least one processing core. The processor(s) can be assembled in a single chipset or can be distributed over many computing chipsets.

The CPU 140 can initiate execution of the firmware 112 to begin a bootup process. As such, the CPU 140 can execute one of the FFS files 114 that causes the CPU 140 to generate data identifying an inventory of system devices 142 functionally coupled to the CPU 140. The system devices can include, for example, CPU(s); DIMM(s); PCIe device(s); or a combination thereof. The firmware 112 can send such data to the BMC 150 by means of an IPMI protocol, through the CPU 140. To that, the CPU 140 can be functionally coupled to the firmware 112 by means of a serial peripheral interface (SPI) and/or a e-SPI bus.

The CPU 140 can execute the script generation firmware 116 as part of the bootup process. Execution of the script generation driver 116 is represented by a logic script generation process 140. As a result of executing the script generation driver 116, the firmware 112 can compose a logic script 144 having program code that defines a procedure to identify a system device for disablement. The logic script 144 can be configured, at least partially, using defined semantics of a REDFISH-compliant interface and can constitute a REDFISH-compliant action. The logic script 144 can be composed according to a particular scripting language, such as a Lua, Python, a Perl, SSH, or similar. An example of the logic script 144 is presented in Table 1 simply for the sake of illustration.

TABLE 1

Example of logic script 144 in accordance with aspects of this disclosure.
local turbo = require("turbo")
local RedfishDynamicHandler = require("redfish-dynamic-handler")
local CONFIG = require("config")
local _ = require("underscore")
local MapOutHandler = class("MapOutHandler", RedfishDynamicHandler)
local yield = coroutine.yield TABLE 1-continued local utils = require("utils")
local OEM_CONSTANTS = require("constants")
-- ###POST request handler for OEM
function MapOutHandler:post( )
  local response = { }
  local url_segments =self: get_url_segments( );
  if self: can_user_do("ConfigureComponents") == true then
    local collection, id, secondary_collection, instance, third_collection,
secondary instance = url_segments[1], url_segments[2], url_segments[3],
url_segments[4], url_segments[5], url_segments[6]
    local prefix ="Redfish:" .. collection .. ":" .. id ..
secondary_collection .. ":" .. instance
    local request_data =
turbo.escape.json_decode(self:get_request( ).body)
    local riska = self:get_dynamic_db( )
    local pl = riska:pipeline( )
    if secondary_collection == "PCIeDevices" and third collection ==
"Functions" then
      prefix = prefix .. ":" .. third_collection ..
secondary_instance
      instance = string.sub(secondary_instance,1,13)
    end
    local status = self:access_main_db("get", prefix .. ": Status: State")
    if secondary_collection == "Memory" or (secondary_collection ==
"PCIeDevices" and third_collection == "Functions") then
      if( status ~= nil and status ~= "Absent" ) then
        if request_data.State == "Disabled" then
    yield(riska:sadd("Redfish:oem:MappingOut:DeviceList", instance))
          self:set_status(204)
        elseif request_data.State == "Enabled" then
    yield(riska:srem("Redfish:oem:MappingOut:DeviceList", instance))
          self:set_status(204)
        else
    self:error_property_value_not_in list("State",request_data.State, nil)
        end
      else
        self:error_not_acceptable(response)
      end
    end
  end
  self:output( )
end
return MapOutHandler In some embodiments, rather than generating the program code that constitute the logic script 144, the firmware 112 can retrieve the program code from one or more memory elements (not depicted in FIG. 1) within the non-volatile memory device 110. That program code that is retrieved can be retained in the memory element(s) prior to initiating a bootup process of the computing system that includes the CPU 140 and the non-volatile memory device 110.

The firmware 112 can send the logic script 144 to a BMC 150 through the CPU 140. To that, the firmware 112 can send data indicative of the program code in the logic script 144 to the BMC 150 through the CPU 140, by means of a hypermedia REST interface (represented by a label "Restful" in FIG. 1). The data can be expressed using JSON based on OData. The REST interface can be a REDFISH-compliant interface in some embodiments. The BMC 150 can be functionally coupled to the CPU 140 by means of an I2C bus and/or a universal serial bus (USB).

The BMC 150 has components that can permit the BMC 150 to operate in accordance with this disclosure. Such components can include hardware component(s) or software component(s), or a combination of both types of components. While not depicted in FIG. 1, the BMC 150 can include one or more processors that can execute the management server 152. As such, the BMC 150 can receive the logic script 145 and can retain the logic script 145 in the memory device 160. The logic script 144 can be retained in one or more memory elements 168 (referred to as action(s) 168), such as a database. The BMC 150 can thus be configured to provide the functionality defined by program code in the logic script 144. As mentioned, in one example, the functionality can include marking a system device for disablement during bootup of the exemplified computing system 100.

To implement such functionality, the BMC 150 can execute the logic script 144. In response, the BMC 150 can generate data identifying one or several system devices for disablement during a bootup process performed in response to execution of the firmware 112. The generated data can be based on input data received at the BMC 150.

Specifically, a management client device 180 functionally coupled to the BMC 150 can send a request message 185 to BMC 150. The request message 185 can specify one or many system devices to be disabled in the host computing device that contains the CPU 140 and the non-volatile memory device 110. Thus, the request message 185 includes data identifying such system device(s). The BMC 150 can communicate with the management client device 180 by means of an OOB network connection. Thus, the management client device 180 can send the request message 185 using OOB communication. Accordingly, the request message 185 can be referred to as an OOB request.

In some embodiments, the management client device 180 can send the request message 185 using a hypermedia REST interface where data is expressed using a JSON format based on OData. Accordingly, the data included in the request message 185 can be expressed using a JSON format based on OData. Such a hypermedia REST interface is represented with a "RESTful" label in FIG. 1. The hypermedia REST interface utilized by the management client device 180 can be implemented, in some embodiments, as a REDFISH-compliant. The technologies disclosed herein are, of course, not limited to utilizing a REDFISH-compatible interface.

As is illustrated in in FIG. 1, the BMC 150 can include a management server 152. The BMC 150 can execute the management server 152 to perform the functionality described herein for automated identification and recordation of systems devices to be disabled. In one embodiment, the management server 152 can include a management module 154. The BMC 150 can execute the management module 154 to receive and process the request message 185. In response to receiving the request message 185, the management module 154 can execute the logic script 145 to generate a list of system devices to be disabled. Such a list is generated using input data included in the request message 185. The management module 154 can retain such a list in a memory device 132, within one or more data structures 164 (represented as disable device list 164), within one or many memory elements. In one configuration, the memory element(s) can embody a database maintained by the BMC 150.

The list of system devices to be disabled can include at least one identification (ID) record corresponding to respective system devices to be disabled. The at least one ID record can be retained in a database embodying, for example, the disable device list 164. In one example, the list of system devices includes multiple ID records: Device_ID 170(1), Device ID 170(2), . . . and Device_ID 170(K), where K is a natural number greater than unity. Regardless of the number of system devices marked for disablement, each ID record in the disable device list 164 is formatted to uniquely identify a corresponding system device to be disabled.

Figure 2:
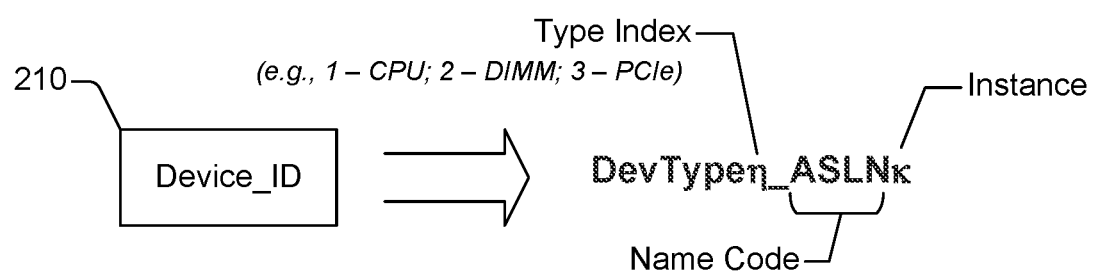
FIG. 2 illustrates an example of a record generated by a BMC to identify a system device to be disabled in a managed computing system, in accordance with one or more embodiments of this disclosure.

FIG. 2 depicts an example of an ID record 210 (labeled "Device_ID" merely for consistency with FIG. 1). The ID record 210 includes first data defining a type of the system device to be disabled. An example of a type is CPU. Another example of type is DIMM. Yet another example of a type is PCIe device, which can be an onboard device or an offboard device. The type can be codified into an index $\eta$, e.g., $\eta=1$ can represent CPU; $\eta=2$ can represent DIMM; and $\eta=3$ can represent PCIe device.

The ID record 210 also includes second data defining a name of the system device. The name can be, for example, an acronym consistent with the type of the device. The ID record 210 can further include third data defining an instance $\kappa$ of the system device. Such an instance $\kappa$ is a number that conveys the cardinality of the system device in a group of system devices of the same type. For instance, in a computing system having 16 CPUs, an instance of a CPU in such a group is a natural number between 1 and 16.

The first data, the second data, and the third data can be structured in many ways. Specifically, as is illustrated in FIG. 2, the first data can include a first string of characters identifying the type. The first string of characters can include, in one example, the index $\kappa$ described hereinbefore. The second data can include a second string of characters identifying the name. The third data can include a third string of characters identifying the instance $\kappa$.

More concretely, the string "DevType1" can represent a CPU. Thus, "DevType1_CPU1" can identify a first CPU, "DevType1_CPU2" can identify a second CPU, and so forth. The string DevType2 can represent a DIMM. Thus, "DevType2_DIMM1" can identifies a first DIMM, "DevType2_DIMM2" identifies a second DIMM, and so forth.

PCIe devices can include onboard devices or offboard devices, or both. The second string of characters (e.g., the "Name Code" depicted in FIG. 2) can differentiate between those types of devices. Accordingly, the string "DevType3" can represent a PCIe device and the string "SAT1" can indicate an onboard PCIe device. Thus, the string "DevType3_SAT1_0" can identify a first onboard PCIe device, the string "DevType3_SAT1_1" can identify a second onboard PCIe device, and so forth. Similarly, the string "SLT3" can indicate a single-function offboard PCIe device. Thus, the string "DevType3_SLT3_0" can identify an instance of such a type of device. Further, the string "SLT6_" can indicate a multi-function PCIe device. The string "DevType3_SLT6_1" can identify an instance of such a type of device, "DevType3_SLT6_2" can identify another instance of the such a type of devices, and so forth.

The list of devices 164 records the system device(s) marked for disablement in the host computing device that includes the CPU 140 and the non-volatile memory device 110. As part of performing a bootup process of the host computing device, the CPU 140 can implement a process 130, referred to as MapOut Acquisition, that accesses the list of devices 164 retained in the BMC 150. Implementing the process 130 includes sending an IPMI command 146 that includes a request for data identifying a system device to be disabled. Execution of the IPMI command 146 results in the request being sent to the BMC 150. In FIG. 1, the IPMI command is labeled "List Request" simply for the sake of nomenclature.

The BMC 150 can execute (or, in some instances, can continue executing) an IPMI component 156 in order to receive and process the IPMI command 146. As is illustrated in FIG. 1, the IPMI component 156 can be included in the management module 154. The IPMI component 156 can send an IPMI response 148 to the CPU 140 in response to the IPMI command 146. The IPMI response 148 includes the one or many ID records included in the disable device list 164. Each one of the ID record(s) corresponds to a system device to be disabled in the host computing system that includes the CPU 140 and the non-volatile memory device 110. In FIG. 1, the IPMI response 148 is labeled "Disable Device List" simply for the sake of nomenclature.

The firmware 112, through the CPU 140, can receive the IPMI response 148 and can utilize the ID record(s) therein to determine if a particular system device identified by a particular ID record of the ID record(s) is present in the computing system being booted. To that end, the CPU 140 can continue executing the firmware 112. In response to ascertaining that the particular system device is present in the computing system, the CPU 140 can continue executing the firmware 112 to disable that particular system device. In some embodiments, as is illustrated in FIG. 1, the firmware 112 can include a disablement component 158 that, when executed by the CPU 140, causes the particular device to be disabled. After disabling the particular system device, the CPU 140 can further continue executing the firmware 112.

Therefore, supplying the logic script 144 to the BMC 150 can provide custom functionality to the BMC 150, such as the capability to mark a system device for disablement. Thus, the functionality of the BMC 150 can be expanded without requiring changes to the structure of the BMC 150 or protocol(s) utilized by the BMC 150, or both. Indeed, in one example, the functionality of the BMC can be expanded without rebuilding BMC firmware source even when the logic script 144 is modified at the firmware 112. Execution of the logic script 144 provides a mechanism for automated identification of system devices for disablement. Combined with functionality of the IPMI protocol, the BMC 150 can supply data identifying such system devices to the firmware 112. In response, as part of booting up a host computing system, the firmware 112 can disable at least one of the system devices included in the host computing system.

It is noted that in some scenarios, the disablement component 158 can disable one or several system devices without reliance on receiving the disable list 148. In such scenarios, after disabling a particular device of such system device(s), the firmware 112 can send a notification message to the BMC 150 by means of the disablement component 158. The notification message can include payload data defines the device disabled state of the particular devices.

Figure 3:
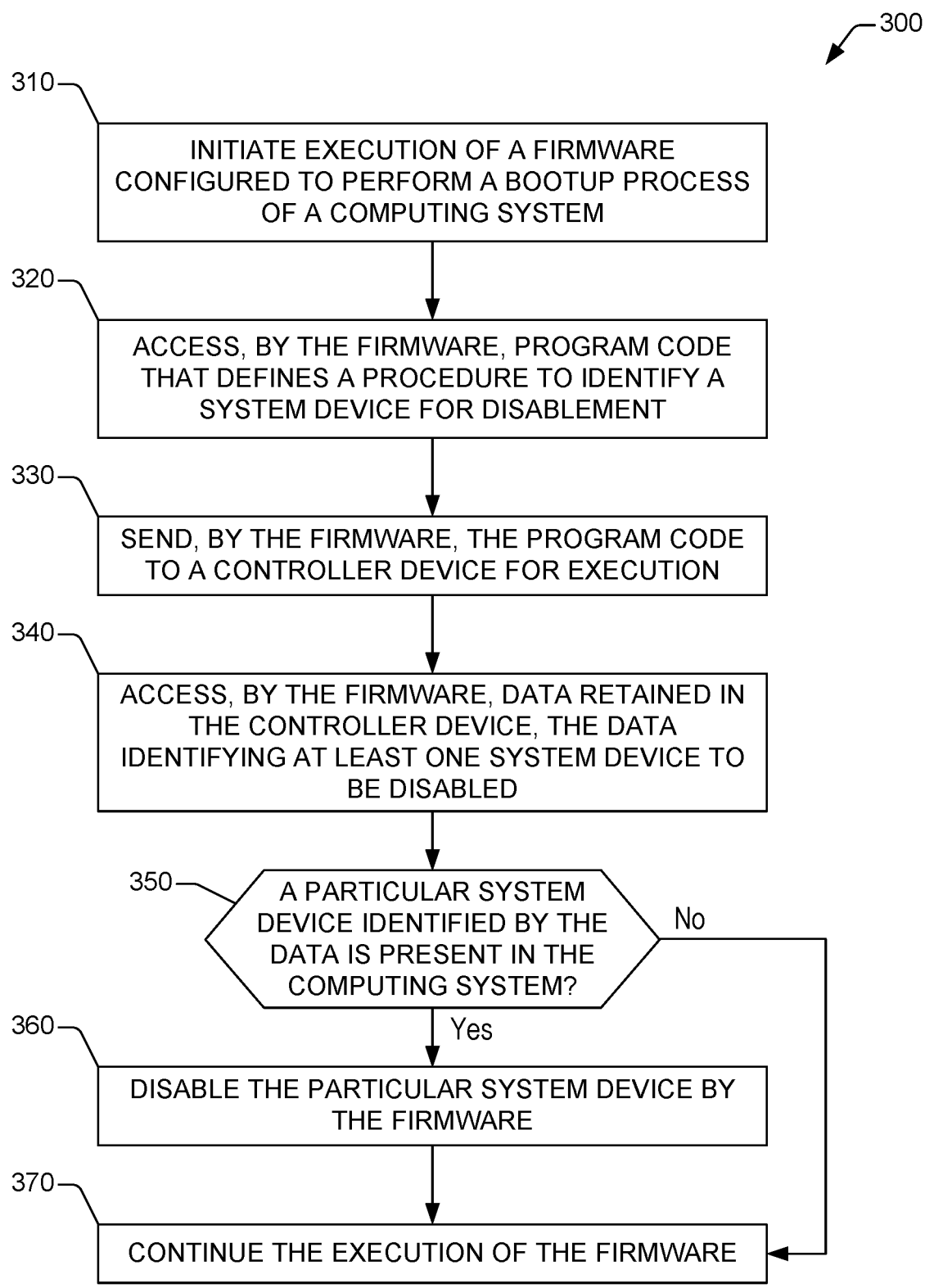
FIG. 3 illustrates an example of a method for automated identification of system devices of a computing system and disablement of the system devices during bootup of the computing system, in accordance with one or more embodiments of this disclosure.
Figure 4:
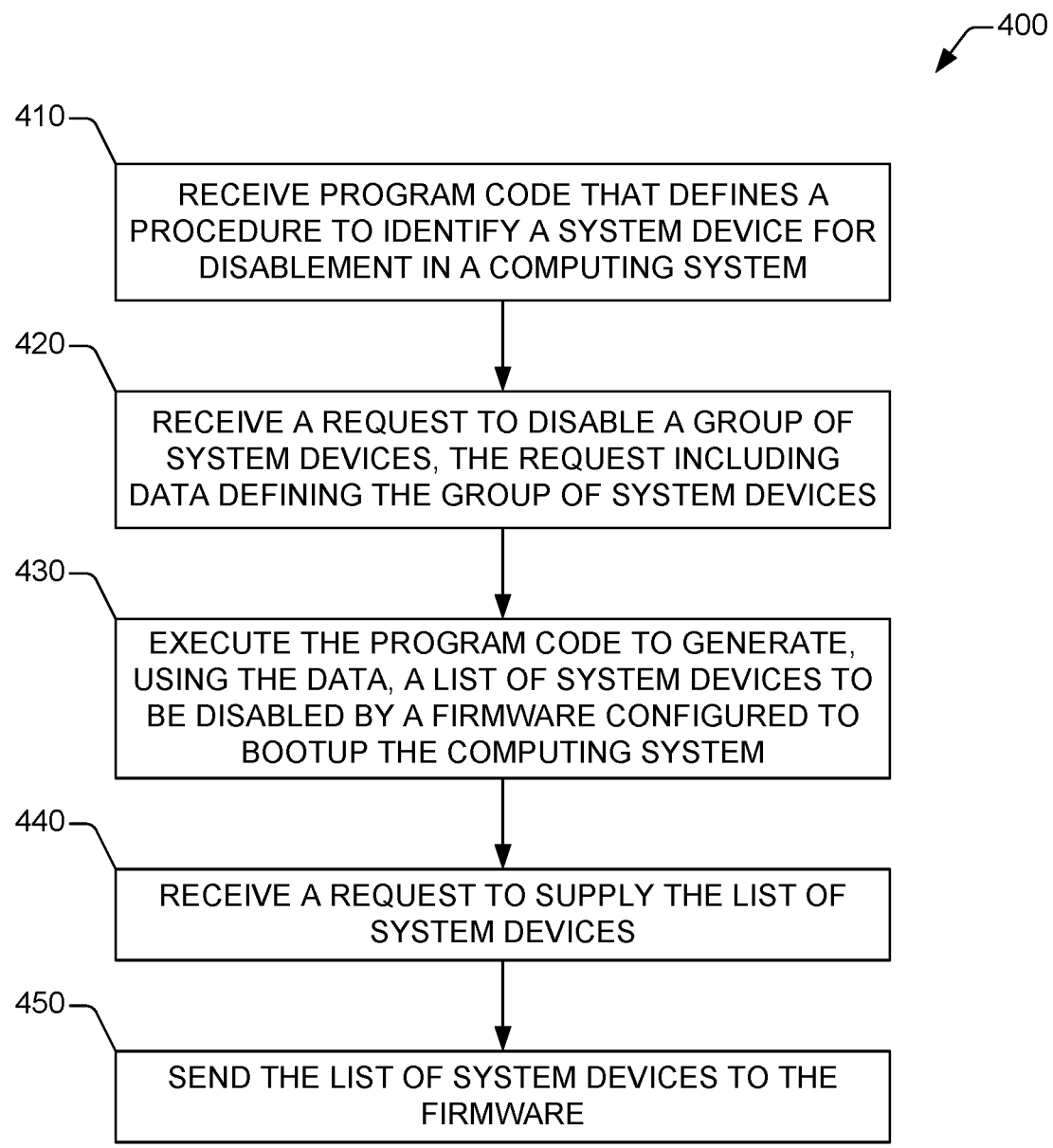
FIG. 4 illustrates an example of a method for automated identification of system devices to be disable during bootup of a computing system, in accordance with one or more embodiments of this disclosure.

FIG. 3 and FIG. 4 illustrate example of methods that emerge from this disclosure. The example methods are illustrated as a collection of blocks in a logical flow graph, which represent a sequence of operations that can be implemented in hardware, software, or a combination thereof. In the context of software, the blocks can represent computer-executable instructions that, when executed by one or more processors, perform the recited operations. Generally, computer-executable instructions can embody, or can constitute, routines, programs, objects, components, data structures, and the like configured to cause a computing device to perform or implement particular functions. The order in which operations are described is not intended to be construed as a limitation. Any number of the described blocks can be combined in any order and/or, in some instances, two or more of the blocks can be implemented in parallel in order to perform the example method 300 or the example method 400, or both example methods in combination. Other techniques described throughout this disclosure can be interpreted accordingly.

FIG. 3 is a flowchart of an example method 300 for disabling system devices in a computing system, in accordance with one or more embodiments of this disclosure. A processing device, or multiple processing devices, executing the firmware (e.g., firmware 112, FIG. 1) of a host computing device can perform the example method 300. The host computing device can be embodied in, or can include, for example, a blade server device. The firmware can include machine-accessible instructions that, in response to execution by the processor or another computing device, can cause the processor to perform the example method 300. For instance, the machine-accessible instructions can embody or can constitute FFS files 114 and the script generation driver 116 in accordance with aspects of this disclosure. Such machine-accessible instructions can be encoded on a non-transitory computer-readable storage medium, such as one or more memory devices.

A processing device includes one or many processors that can be assembled in one or many computing chipsets, each processor including one or more processing cores. The processing device can be embodied in a single CPU, multiple CPUs, a single graphics processing unit (GPU), multiple GPUs, other types of processing circuitry, or a combination thereof.

The example method 400 can be performed as part of a bootup process of a computing system that includes the host computing device and a controller device in accordance with aspects of this disclosure. For instance, the controller device can be embodied in or can include the BMC 150. The controller device can be functionally coupled to the host computing device or integrated therein.

At block 310 a processing device can initiate execution of a firmware (e.g., firmware 112 (FIG. 1)) configured to perform a bootup process of a computing device. In some embodiments, the computing device and the processing device are embodied in a host computing device that includes the BMC 150 and the CPU 140, respectively.

At block 320, the processing device, by means of the firmware, can access program code that defines a procedure to identify a system device for disablement. The system device can be embodied in, for example, a CPU, a DIMM, a PCIe, or similar. In some embodiments, accessing the program code can include generating, by the firmware, the program code. Generating the program code can include generating a script defining logic to identify the system device for disablement. In some embodiments, the script can be configured, at least partially, using defined semantics of a hypermedia REST interface. As such, the procedure can correspond to an action configured according to the REST interface. The script can be generated in any scripting language, such as Lua, Python, Perl, SSH, or similar. As mentioned, the firmware can generate an additional or different program code that provides other functionality besides identifying one or many devices for disablement.

In other embodiments, accessing the program code can include retrieving the program code from one or more memory elements within a non-volatile memory device that retains the firmware. The program code that is retrieved can be retained in the memory element(s) prior to initiating the execution of the firmware.

At block 330, the processing device, by means of the firmware, can send the program code to a controller device for execution. Execution of the program code by the controller device can generate data identifying one or many system devices to be disabled. The controller device can retain the generated data in a database within a memory device of the controller device, for example. In some embodiments, the controller device can be the BMC 150 (FIG. 1).

At block 340, the processing device, by means of the firmware, can access data retained in the controller device (e.g., the BMC 150), data identifying at least one system device to be disabled. Accessing such data can include sending a command to retrieve the data from the database that contains data resulting from execution of the program code by controller device. The command can be configured, for example, according to an IPMI protocol.

As a result of sending such a command, the firmware can receive the data identifying at least one system device to be disabled. The data can define various types of information that characterizes a particular system device.to be disabled. In one example, the data can include first data defining a type of the particular system device; second data defining a name of the particular system device; and third data indicative of an instance of the particular system device. The first data, the second data, and the third data can be structured in many ways. Specifically, continuing with the example above, the first data can include a first string of characters identifying the type. The second data can include a second string of characters identifying the name. The third data can include a third string of characters identifying the instance.

At block 350, the processing device, by means of the firmware, can determine if the particular system device of the at least one system devices to be disabled is present in the computing system performing the bootup process. The particular system device can be, for example, a CPU, a DIMM, or a PCIe device. In response to ascertaining that the particular system device is present in the computing system, the example method can continue to block 360, where the firmware can disable that particular system device. After disabling the particular system device, the firmware can then continue the execution of the firmware at block 370.

The example method 300 proceeds from block 350 to block 370 in response to ascertaining that the particular system device is not present in the computing system.

FIG. 4 is a flowchart of an example method 400 for identifying system devices to be disabled in a computing system, in accordance with one or more embodiments of this disclosure. A controller device in accordance with this disclosure can perform the example method 400. For instance, the controller device can be embodied in the BMC 150. Therefore, in some embodiments, the controller device can include machine-accessible instructions that, in response to execution by the controller device (or, more particularly, at least one processor therein or coupled thereto) can cause the controller device to perform the example method 400. For instance, the machine-accessible instructions can embody or can constitute the management server 152, including the IPMI component 156 and the disablement component 158, in accordance with aspects of this disclosure. Such machine-accessible instructions can be encoded on a non-transitory computer-readable storage medium, such as one or more memory devices. As discussed herein, the controller device can form part of a computing system including at least one processor that can execute a firmware configured to perform a bootup process of the computing system.

At block 410, the controller device can receive program code that defines a procedure to identify a system device for disablement in a computing system. In some embodiments, receiving the program code can include receiving data using a REST interface, where the data can be expressed using a JSON format based on OData. In addition, or in some embodiments, receiving the program code can include receiving a logic script composed according to a defined scripting language. The defined scripting language can be, for example, one of a Lua, Python, Perl, SSH, or similar.

At block 420, the controller device can receive a request to disable a group of system devices. The request includes data defining the group of system devices. In some embodiments, the request can be an 00B request received from a client device (e.g., management client device 180 (FIG. 1)). The group of devices can include, for example, a single PCIe device (onboard or offboard); multiple PCIe devices; a single DIMM; multiple DIMMs; or a combination of PCIe devices and DIMMs. At block 430, the controller device can execute the program code to generate, using the data in the request, a list of system devices to be disabled by the firmware configured to bootup the computing system.

At block 440, the controller device can receive a request to supply the list of system devices. The request can be embodied in, or can constitute, for example, an IPMI command (e.g., List Request 146, for example). At block 450, the controller device can send the list of system devices to the firmware in response to the request. The list can be sent, for example, as part of an IPMI response (e.g., Disable Device List 148) to an IPMI that embodies the request received at block 440.

Blocks 410, 420, and 430 can implemented in response to a bootup process of the computing system. In turn, block 440 and block 450 can be implemented in in a next bootup process of the computing system.

Figure 5:
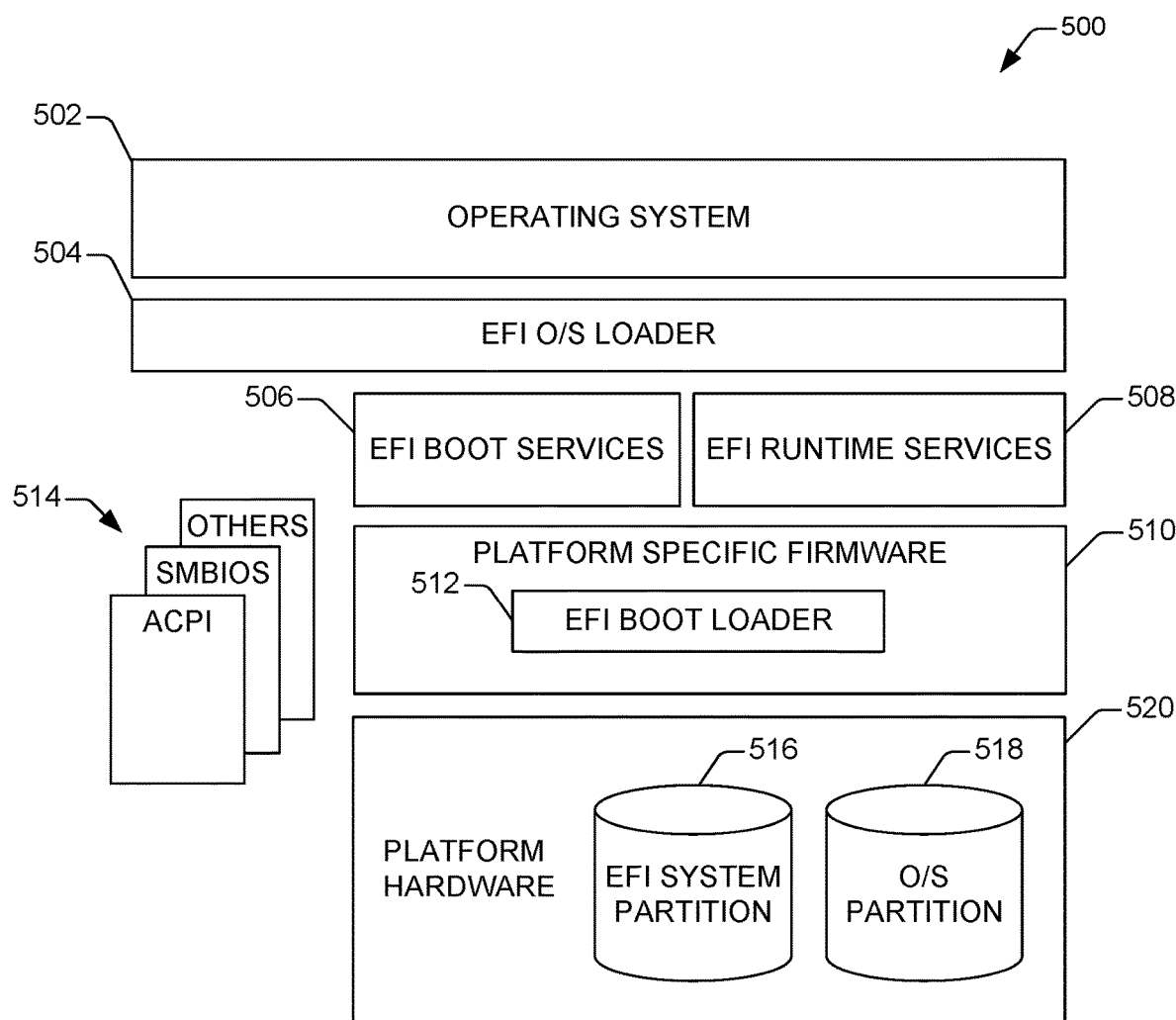
FIG. 5 illustrates an example of a software architecture for a unified extensible firmware interface (UEFI)-compliant firmware that provides an operating environment for aspects of the technologies presented herein in one or more embodiments.

FIG. 5 illustrates an example of a software architecture 500 that includes a UEFI Specification-compliant firmware that can be configured to provide and/or utilize aspects of the technologies disclosed herein. In particular, the firmware architecture shown in FIG. 5 can be utilized to implement the firmware 112 described above. The firmware 112 also can be implemented in other ways in other configurations.

The UEFI Specification describes an interface between an operating system 502 and a UEFI Specification-compliant firmware 500. The UEFI Specification also defines an interface that the firmware 500 can implement, and an interface that the operating system 502 (which might be referred to herein as an OS) can use while booting. How a firmware implements the interface can be left up to the manufacturer of the firmware. The UEFI Specification also defines a way for the operating system 502 and the firmware 500 to exchange information necessary to support the operating system boot process. The terminology "UEFI Specification" used herein refers to both the EFI Specification developed by INTEL CORPORATION and the UEFI Specification managed by the UEFI FORUM.

As is illustrated in FIG. 5, the architecture can include platform hardware 520, such as that described below with regard to FIG. 6, and the operating system 502. A boot loader 512 for the operating system 502 can be retrieved from the UEFI system partition 516 using a UEFI operating system loader 504. The UEFI system partition 516 can be an architecturally shareable system partition. As such, the UEFI system partition 516 can define a partition and file system designed to support safe sharing of mass storage between multiple vendors. An OS partition 518 can also be utilized.

Upon or after started, the UEFI OS loader 504 can continue to boot the complete operating system 502. In doing so, the UEFI OS loader 504 can use UEFI boot services 506, an interface to other supported specifications to survey, comprehend, and initialize the various platform components and the operating system software that manages them. Thus, interfaces 514 from other specifications can also be present on the system. For example, the ACPI and the System Management BIOS (SMBIOS) specifications can be supported.

UEFI boot services 506 can provide interfaces for devices and system functionality used during boot time. UEFI runtime services 508 can also be available to the UEFI OS loader 504 during the boot phase. UEFI allows extension of platform firmware by loading UEFI driver and UEFI application images which, when loaded, have access to UEFI-defined runtime and boot services.

Additional details regarding the operation and architecture of a UEFI Specification-compliant firmware can be found in the UEFI Specification which is available from the UEFI Forum. INTEL CORPORATION has also provided further details regarding recommended implementation of EFI and UEFI in the form of The INTEL Platform Innovation Framework for EFI ("the Framework"). Unlike the UEFI Specification, which focuses on programmatic interfaces for the interactions between the operating system 502 and firmware 500, the Framework is a group of specifications that together describe a firmware implementation that has been designed to perform the full range of operations that are required to initialize a platform from power on through transfer of control to the operating system 502. The specifications that make up the Framework, which are also available from INTEL CORPORATION, are also expressly incorporated herein by reference.

Figure 6:
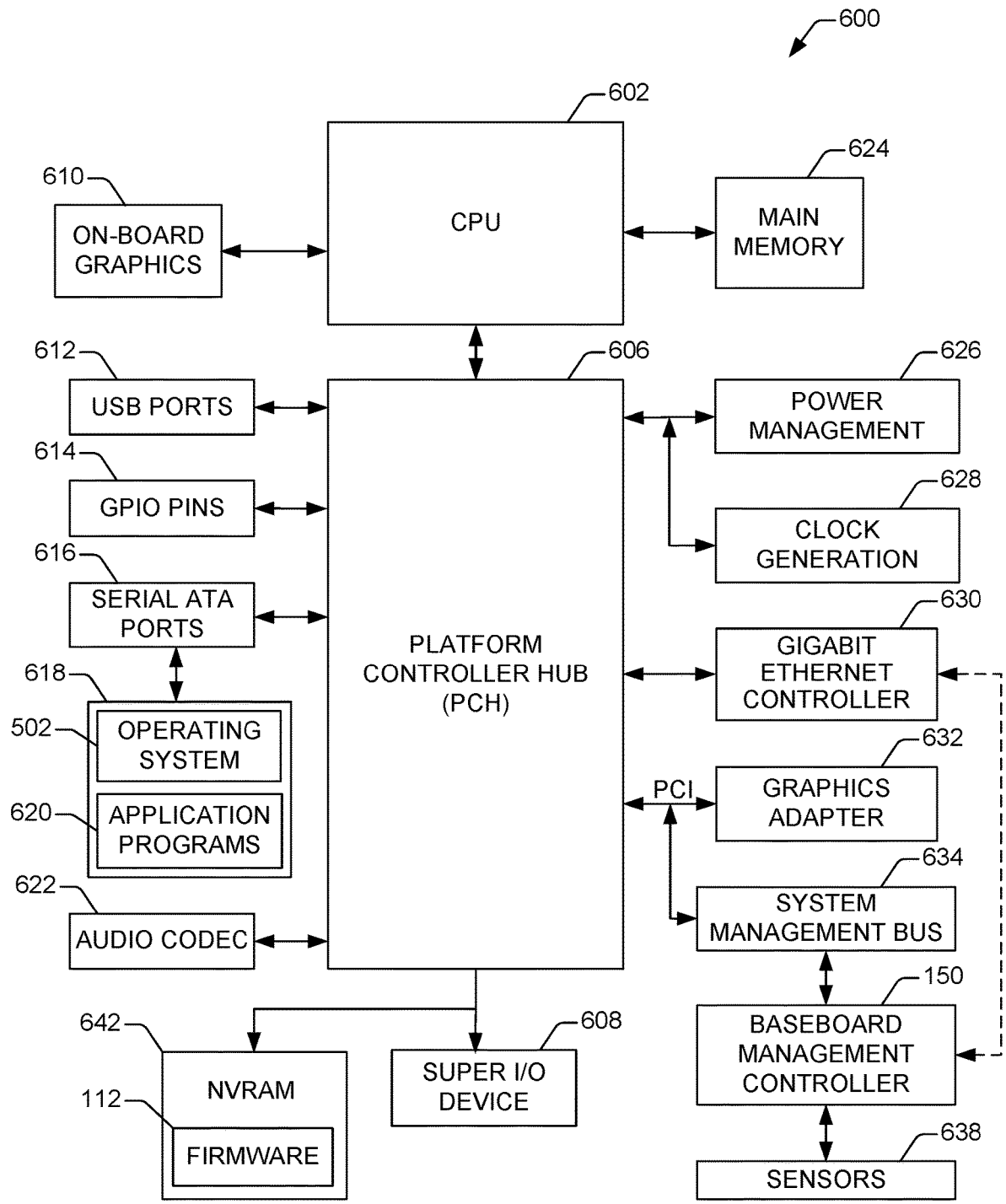
FIG. 6 illustrates an example of a computer architecture for a computer that can implement the technologies disclosed herein, in accordance with one or more embodiments.

FIG. 6 illustrates an example of a computer architecture that can provide an operating environment for the technologies presented herein. For example, the computer architecture can be utilized to implement the computing architecture 100 and/or any of the other managed computing systems disclosed herein.

FIG. 6 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, it is noted that the configurations described herein can be practiced with other computer system configurations, including hand-held devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 6 illustrates an example of a computer architecture for a computer 600 that can be utilized in the implementations described herein. The illustrative computer architecture shown in FIG. 6 includes a baseboard, or "motherboard", which is a printed circuit board to which a multitude of components or devices can be connected by way of a system bus or other electrical communication path. In one configuration, a CPU 602 operates in conjunction with a Platform Controller Hub (PCH) 606. The CPU 602 is a central processor that performs arithmetic and logical operations necessary for the operation of the computer 600. The computer 600 can include a multitude of CPUs 602. Each CPU 602 can include multiple processing cores.

The CPU 602 provides an interface to one or more RAM devices used as the main memory 624 in the computer 600 and, possibly, to an on-board graphics adapter 610. The PCH 606 provides an interface between the CPU 602 and the remainder of the computer 600.

The PCH 606 can also be responsible for controlling many of the input/output functions of the computer 600. In particular, the PCH 606 can provide one or more universal serial bus (USB) ports 612, an audio codec 622, a Gigabit Ethernet Controller 630, and one or more general purpose input/output (GPIO) pins 614. The USB ports 612 can include USB 2.0 ports, USB 3.0 ports and USB 3.1 ports among other USB ports. The audio codec 622 can include Intel High Definition Audio, Audio Codec '97 (AC'97) and Dolby TrueHD among others.

The PCH 606 can also include functionality for providing networking functionality through a Gigabit Ethernet Controller 630. The Gigabit Ethernet Controller 630 is capable of connecting the computer 600 to another computer via a network. Connections which can be made by the Gigabit Ethernet Controller 630 can include LAN or WAN connections. LAN and WAN networking environments are commonplace in offices, enterprise-wide computer networks, intranets, and the Internet.

The PCH 606 can also provide a bus for interfacing peripheral card devices, such as the graphics adapter 632. In one configuration, the bus comprises a PCI bus. The PCI bus can include a Peripheral Component Interconnect (PCI) bus, a Peripheral Component Interconnect eXtended (PCI-X) bus and a Peripheral Component Interconnect Express bus among others.

The PCH 606 can also provide a system management bus 634 for use in managing the various components of the computer 600. Additional details regarding the operation of the system management bus 634 and its connected components are provided below. Power management circuitry 626 and clock generation circuitry 628 can also be utilized during the operation of the PCH 606.

The PCH 606 is also configured to provide one or more interfaces for connecting mass storage devices to the computer 600. For instance, according to one configuration, the PCH 606 includes a serial advanced technology attachment (SATA) adapter for providing one or more serial ATA ports 616. The serial ATA ports 616 can be connected to one or more mass storage devices storing an OS, such as OS 502 and application programs 620, such as a SATA disk drive 618. As known to those skilled in the art, an OS 502 comprises a set of programs that control operations of a computer and allocation of resources. An application program is software that runs on top of the operating system 1802, or other runtime environment, and uses computer resources to perform application specific tasks desired by the user.

According to one configuration, the OS 502 comprises the LINUX operating system. According to another configuration, the OS 502 comprises the WINDOWS operating system from MICROSOFT CORPORATION. According to another configuration, the OS 502 comprises the UNIX operating system or one of its variants. It is noted that other operating systems can also be utilized.

The mass storage devices connected to the PCH 606, and their associated computer-readable storage media, provide non-volatile storage for the computer 600. Although the description of computer-readable storage media contained herein refers to a mass storage device, such as a hard disk or CD-ROM drive, it is noted that computer-readable storage media can be any available media that can be accessed by the computer 600.

As an illustration, computer-readable storage media can comprise computer storage media and communication media. Computer storage media includes volatile and nonvolatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid-state memory technology, CD-ROM, DVD, HD-DVD, BLU-RAY, or other optical storage, magnetic cassettes, magnetic tape, magnetic disk storage or other magnetic storage devices, or any other medium which can be used to store the desired information, and which can be accessed by the computer 600.

Communication media can embody information in a data signal, such as a modulated data signal (e.g., a carrier wave or another transport mechanism) and includes information delivery media or transport media. In some embodiments, the information can include machine-accessible instructions (e.g., computer-readable instructions and/or computer-executable instructions), data structures, program modules, or other structured or unstructured data. The terminology "modulated data signal" as utilized herein refers to a signal that has one or more of its characteristics set or changed in such a manner as to encode information in the signal. Communication media include wired media and wireless media. For example, wired media can include a wired network and/or direct-wired connection including solid-state media for the transport of signals. As another example, wireless media can include numerous media for the wireless transport of electromagnetic radiation, such as acoustic waves, RF waves, infrared waves, microwave waves, and other forms of electromagnetic waves.

A low pin count (LPC) interface can also be provided by the PCH 606 for connecting a Super I/O device 608. The Super I/O device 608 is responsible for providing a number of input/output ports, including a keyboard port, a mouse port, a serial interface, a parallel port, and other types of input/output ports. The LPC interface can also connect a computer storage media such as a ROM or a flash memory such as a NVRAM 642 for storing firmware 112 that includes program code containing the basic routines that help to start up the computer 600 and to transfer information between elements within the computer 600 as discussed above with regard to FIG. 5.

The program modules disclosed herein, including the firmware 112, can include software instructions that, when loaded into the CPU 602 and executed, transform a general-purpose computer into a special-purpose computer customized to permit or otherwise facilitate all, or part of, the operations disclosed herein. As detailed throughout this disclosure, the program modules can provide various tools or techniques by which the computer 600 can participate within the overall systems or operating environments using the components, logic flows, and/or data structures discussed herein.

The CPU 602 can be constructed from any number of transistors or other circuit elements, which can individually or collectively assume any number of states. More specifically, the CPU 602 can operate as a state machine or finite-state machine. Such a machine can be transformed to a second machine, or a specific machine, by loading executable instructions contained within the program modules. These computer-executable instructions can transform the CPU 602 by specifying how the CPU 602 transitions between states, thereby transforming the transistors or other circuit elements constituting the CPU 602 from a first machine to a second machine, wherein the second machine can be specifically configured to perform the operations disclosed herein. The states of either machine can also be transformed by receiving input from one or more user input devices, network interfaces (such as the Gigabit Ethernet Controller 630), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include but are not limited to: the technology used to implement the storage media, whether the storage media are characterized as primary or secondary storage, and the like. For example, if the storage media are implemented as semiconductor-based memory, the program modules can transform the physical state of the main memory 624 (e.g., a semiconductor solid-state memory device) and/or the NVRAM 604. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described herein, the PCH 606 can include a system management bus 634. As discussed above, when utilized to implement the computing architecture 100, the system management bus 634 can include a BMC 106. As discussed herein, the BMC 106 is a microcontroller that monitors operation of the computer 600. In a more specific configuration, the BMC 150 monitors health-related aspects associated with the computer 600, such as, but not limited to, the temperature of one or more components of the computer 600, speed of rotational components (e.g., spindle motor, CPU fan, etc.) within the computer 600, the voltage across or applied to one or more components within the computer 600, and the available and/or used capacity of memory devices within the computer 600. To accomplish these monitoring functions, for example, the BMC 106 can be communicatively connected to one or more components by way of the system management bus 634 in some configurations.

In one configuration, these components include sensor devices 638 for measuring various operating and performance-related parameters within the computer 600. The sensor devices 638 can be either hardware or software based components configured or programmed to measure or detect one or more of the various operating and performance-related parameters.

The BMC 150 functions as the master on the system management bus 634 in most circumstances, but can also function as either a master or a slave in other circumstances.

Each of the various components communicatively connected to the BMC 150 by way of the system management bus 634 is addressed using a slave address. The system management bus 634 is used by the BMC 150 to request and/or receive various operating and performance-related parameters from one or more components, such as the firmware 112, which are also communicatively connected to the system management bus 634.

It is noted that the functionality provided by the computer 600 can be provided by other types of computing devices, including hand-held computers, smartphones, gaming systems, set top boxes, tablet computers, embedded computer systems, personal digital assistants, wearable devices, and other types of computing devices available in the art. It is also contemplated that the computer 600 might not include all the components shown in FIG. 6; can include other components that are not explicitly shown in FIG. 6; or might utilize an architecture completely different than that shown in FIG. 6.

OTHER EXAMPLE EMBODIMENTS

Numerous other embodiments emerge from the foregoing detailed description and annexed drawings. For instance, an Example 1 of those embodiments includes a computer-implemented method. The computer-implemented method includes initiating execution of a firmware configured to perform a bootup process of a computing system having multiple system devices, the firmware retained in a non-volatile memory of the computing system; accessing, by the firmware, program code that defines a procedure to identify a system device for disablement, wherein the accessing includes one of generating the program code or retrieving the program code from a memory element within the non-volatile memory; sending, by the firmware, the program code to a baseboard management controller (BMC), wherein execution of the program code by the BMC generates data identifying one or more second system devices to be disabled; accessing, by the firmware, second data from a memory device within the BMC; determining, using the second data, that a first system device of the multiple system devices is to be disabled; and disabling the first system device by the firmware.

An Example 2 of the numerous other embodiments includes the computer-implemented method of Example 1, where the generating the program code comprises generating a script defining logic to identify the system device for disablement, and wherein the script is configured, at least partially, using defined semantics of a hypermedia REST interface.

An Example 3 of the numerous other embodiments includes the computer-implemented method of any of Example 1 or Example 2, where the procedure corresponds to an action configured according to the REST interface.

An Example 4 of the numerous other embodiments includes the computer-implemented method of any of Example 1, Example 2, or Example 3, where the accessing the data comprises executing a command to retrieve the data from a database retained in the BMC, the command configured according to an IPMI protocol.

An Example 5 of the numerous other embodiments includes the computer-implemented method of any of Example 1, Example 2, Example 3, or Example 4, where the accessing further comprises receiving the data, and where the data include first data indicative of a type of the first system device; second data indicative of a name of the first system device; and third data indicative of an instance of the first system device in the computing system.

An Example 6 of the numerous other embodiments includes the computer-implemented method of any of Example 1, Example 2, Example 3, Example 4, or Example 5, where the first data comprises a first string of characters identifying the type, and where the second data comprises a second string of characters identifying the name, and further wherein the third data comprises a third string of characters identifying the instance.

An Example 7 of the numerous other embodiments includes the computer-implemented method of any of Example 1, Example 2, Example 3, Example 4, Example 5, or Example 6, where the sending the program code comprises sending data using a hypermedia REST interface, the data expressed using a JSON format based on OData.

An Example 8 of the numerous other embodiments includes at least one computer-readable non-transitory storage medium having instructions encoded thereon that, in response to execution, cause a computing device to perform or facilitate operations including: initiating execution of a firmware configured to perform a bootup process of a computing system having multiple system devices, the firmware retained in a non-volatile memory device of the computing system; accessing, by the firmware, program code that defines a procedure to identify a system device for disablement; sending, by the firmware, the program code to a controller device, wherein execution of the program code by the controller device generates data identifying one or more second system devices to be disabled; accessing, by the firmware, second data from a memory device within the controller device; determining, using the second data, that a first system device of the multiple system devices is to be disabled; and disabling the first system device by the firmware.

An Example 9 of the numerous other embodiments includes the at least one computer-readable non-transitory storage medium of Example 8, where the generating the program code comprises generating a script defining logic to identify a system device for disablement, and wherein the script is configured, at least partially, using defined semantics of a hypermedia REST interface.

An Example 10 of the numerous other embodiments includes the at least one computer-readable non-transitory storage medium of any of Example 8 or Example 9, where the procedure corresponds to an action according to the hypermedia REST interface.

An Example 11 of the numerous other embodiments includes the at least one computer-readable non-transitory storage medium of any of Example 8, Example 9, or Example 10, where the accessing the data comprises executing a command to retrieve the data from the memory device, the command configured according to an IPMI protocol.

An Example 12 of the numerous other embodiments includes the at least one computer-readable non-transitory storage medium of any of Example 8, Example 9, Example 10, or Example 11, the operations further comprising receiving the data, wherein the data include first data indicative of a type of the first system device; second data indicative of a name of the first system device; and third data indicative of an instance of the first system device in the computing system.

An Example 13 of the numerous other embodiments includes the at least one computer-readable non-transitory storage medium of any of Example 8, Example 9, Example 10, Example 11, or Example 12, where the sending the program code comprises sending data using a hypermedia REST interface, the data expressed using a JSON format based on OData.

An Example 14 of the numerous other embodiments includes a computing device. The computing device includes: at least one processor; and at least one memory device having computer-executable components stored thereon that, in response to execution by the at least one processor, cause the computing device at least to: initiate execution of a firmware configured to perform a bootup process of a computing device having multiple system devices, the firmware retained in a non-volatile memory device of the computing system; access, by the firmware, program code that defines a procedure to identify a system device for disablement; send, by the firmware, the program code to a controller device, wherein execution of the program code by the controller device generates data identifying one or more second system devices to be disabled; access, by the firmware, second data from a memory device within the controller device; determine, using the second data, that a first system device of the multiple system devices is to be disabled; and disable the first system device by the firmware.

An Example 15 of the numerous other embodiments includes the computing device of Example 14, wherein the program code comprises a script defining logic to identify the first system device for disablement, the script being configured, at least partially, using defined semantics of a hypermedia REST interface.

An Example 16 of the numerous other embodiments includes the computing device of any of Example 14 or Example 15, where the procedure corresponds to an action configured according to the (REST) interface.

An Example 17 of the numerous other embodiments includes the computing device of any of Example 14, Example 15, or Example 16, where the multiple system devices comprise one or more of a CPU, a DIMM, or a PCIe device.

An Example 18 of the numerous other embodiments includes the computing device of any of Example 14, Example 15, Example 16, or Example 17, where sending the program code comprises sending data using a hypermedia REST interface, the data expressed using a JSON format based on OData.

An Example 19 of the numerous other embodiments includes the computing device of any of Example 14, Example 15, Example 16, Example 17, or Example 18, where the accessing the data comprises executing a command to retrieve the data from the memory device, the command configured according to an IPMI protocol.

An Example 20 of the numerous other embodiments includes the computing device of any of Example 14, Example 15, Example 16, Example 17, Example 18, or Example 19, where the data comprises a data structure that uniquely identifies the first device, the data structure including first data indicative of a type of the first system device; second data indicative of a name of the first system device; and third data indicative of an instance of the first system device in the computing system.

An Example 21 of the numerous other embodiments includes a computing device. The computing device includes: at least one processor; and at least one memory device having computer-executable components stored thereon that, in response to execution by the at least one processor, cause the computing device at least to: receive program code that defines a procedure to identify a system device for disablement in a computing system; receive a request to disable a group of system devices, the request including data defining the group of system devices; and generate, using the data, a list of system devices to be disabled by a firmware configured to bootup the computing system, the list of system devices being generated by executing the program code.

An Example 22 of the numerous other embodiments includes the computing device of Example 21, where the computer-executable components further cause the computing device to: receive a request to supply the list of system devices, wherein the request is received in a command configured according to an Intelligent Platform Management Interface (IPMI) protocol; and send the list of system device to the firmware, wherein the list of system devices is sent in a response message responsive to the command.

An Example 23 of the numerous other embodiments includes the computing device of any of Example 21 or Example 22, where receiving the program code comprises receiving data using a hypermedia REST interface, the data expressed using a JSON format based on OData.

An Example 24 of the numerous other embodiments includes the computing device of any of Example 21, Example 22, or Example 23, where receiving the program code comprises receiving a logic script composes according to a defined scripting language.

An Example 25 of the numerous other embodiments includes the computing device of any of Example 21, Example 22, Example 23, or Example 24, where the system devices in the list comprise one or more of a CPU, a DIMM, or a PCIe device.

Based on the foregoing, technologies for automatically identifying system devices for disablement in a computing system, and disabling the system devices during bootup of the computing system have been disclosed herein. Although the subject matter presented herein has been described in language specific to computer structural features, methodological acts, and computer readable media, it is to be understood that the present disclosure is not necessarily limited to the specific elements, features, acts, or non-transitory storage media disclosed herein. Rather, the specific elements, features, acts, and non-transitory storage media are disclosed as example forms.

The subject matter disclosed herein is provided by way of illustration only and should not be construed as limiting. Various modifications and changes can be made to the subject matter described herein without following the example configurations and applications illustrated and described, and without departing from the true spirit and scope of the present disclosure.

What is claimed is:

1. A computer-implemented method, comprising:
   initiating execution of a firmware configured to perform a bootup process of a computing system having multiple system devices, the firmware retained in a non-volatile memory of the computing system;
   accessing, by the firmware, program code that defines a procedure to identify a system device for disablement, wherein the accessing includes one of generating the program code or retrieving the program code from a memory element within the non-volatile memory;
   sending, by the firmware, the program code to a baseboard management controller (BMC), wherein execution of the program code by the BMC generates data identifying one or more second system devices to be disabled;
   accessing, by the firmware, second data from a memory device within the BMC;

determining, using the second data, that a first system device of the multiple system devices is to be disabled; and disabling the first system device by the firmware.

2. The computer-implemented method of claim 1, wherein the generating the program code comprises generating a script defining logic to identify the system device for disablement, and wherein the script is configured, at least partially, using defined semantics of a hypermedia representational state transfer (REST) interface.

3. The computer-implemented method of claim 2, wherein the procedure corresponds to an action configured according to the hypermedia REST interface.

4. The computer-implemented method of claim 1, wherein the accessing the data comprises executing a command to retrieve the data from a database retained in the BMC, the command configured according to an Intelligent Platform Management Interface (IPMI) protocol.

5. The computer-implemented method of claim 4, wherein the accessing further comprises receiving the data, wherein the data comprise, first data indicative of a type of the first system device;
second data indicative of a name of the first system device; and
third data indicative of an instance of the first system device in the computing system.

6. The computer-implemented method of claim 5, wherein the first data comprises a first string of characters identifying the type, and wherein the second data comprises a second string of characters identifying the name, and further wherein the third data comprises a third string of characters identifying the instance.

7. The computer-implemented method of claim 1, wherein the sending the program code comprises sending data using a hypermedia representational state transfer (REST) interface, the data expressed using a JavaScript Object Notation (JSON) format based on Open Data Protocol (OData).

8. At least one computer-readable non-transitory storage medium having instructions encoded thereon that, in response to execution, cause a computing device to perform or facilitate operations comprising:

initiating execution of a firmware configured to perform a bootup process of a computing system having multiple system devices, the firmware retained in a non-volatile memory device of the computing system;
accessing, by the firmware, program code that defines a procedure to identify a system device for disablement;
sending, by the firmware, the program code to a controller device, wherein execution of the program code by the controller device generates data identifying one or more second system devices to be disabled;
accessing, by the firmware, second data from a memory device within the controller device;
determining, using the second data, that a first system device of the multiple system devices is to be disabled; and
disabling the first system device by the firmware.

9. The at least one computer-readable non-transitory storage medium of claim 8, wherein the generating the program code comprises generating a script defining logic to identify a system device for disablement, and wherein the script is configured, at least partially, using defined semantics of a hypermedia representational state transfer (REST) interface.

10. The at least one computer-readable non-transitory storage medium of claim 9, wherein the procedure corresponds to an action according to the hypermedia REST interface.

11. The at least one computer-readable non-transitory storage medium of claim 8, wherein the accessing the data comprises executing a command to retrieve the data from the memory device, the command configured according to an Intelligent Platform Management Interface (IPMI) protocol.

12. The at least one computer-readable non-transitory storage medium of claim 11, the operations further comprising receiving the data, wherein the data comprise, first data indicative of a type of the first system device;
second data indicative of a name of the first system device; and
third data indicative of an instance of the first system device in the computing system.

13. The at least one computer-readable non-transitory storage medium of claim 8, wherein the sending the program code comprises sending data using a hypermedia representational state transfer (REST) interface, the data expressed using a JavaScript Object Notation (JSON) format based on Open Data Protocol (OData).

14. A computing device, comprising:

at least one processor; and
at least one memory device having computer-executable components stored thereon that, in response to execution by the at least one processor, cause the computing device at least to:
initiate execution of a firmware configured to perform a bootup process of a computing device having multiple system devices, the firmware retained in a non-volatile memory device of the computing system;
access, by the firmware, program code that defines a procedure to identify a system device for disablement;
send, by the firmware, the program code to a controller device, wherein execution of the program code by the controller device generates data identifying one or more second system devices to be disabled;
access, by the firmware, second data from a memory device within the controller device;
determine, using the second data, that a first system device of the multiple system devices is to be disabled; and
disable the first system device by the firmware.

15. The computing device of claim 14, wherein the program code comprises a script defining logic to identify the first system device for disablement, the script being configured, at least partially, using defined semantics of a hypermedia representational state transfer (REST) interface.

16. The computing device of claim 15, wherein the procedure corresponds to an action configured according to the hypermedia REST interface.

17. The computing device of claim 14, wherein the multiple system devices comprise one or more of a central processing unit (CPU), a dual in-line memory module (DIMM), or a Peripheral Component Interconnect Express (PCIe) device.

18. The computing device of claim 14, wherein sending the program code comprises sending data using a hypermedia representational state transfer (REST) interface, the data expressed using a JavaScript Object Notation (JSON) format based on Open Data Protocol (OData).

19. The computing device of claim 14, wherein the accessing the data comprises executing a command to retrieve the data from the memory device, the command configured according to an Intelligent Platform Management Interface (IPMI) protocol.

20. The computing device of claim 19, wherein the data comprises a data structure that uniquely identifies the first device, the data structure including,
  first data indicative of a type of the first system device;
  second data indicative of a name of the first system device; and
  third data indicative of an instance of the first system device in the computing system.

21. A computing device, comprising:
  at least one processor; and
  at least one memory device having computer-executable components stored thereon that, in response to execution by the at least one processor, cause the computing device at least to:
    receive program code that defines a procedure to identify a system device for disablement in a computing system;
    receive a request to disable a group of system devices, the request including data defining the group of system devices; and
    generate, using the data, a list of system devices to be disabled by a firmware configured to bootup the computing system, the list of system devices being generated by executing the program code.

22. The computing device of claim 21, wherein the computer-executable components further cause the computing device to,
  receive a request to supply the list of system devices, wherein the request is received in a command configured according to an Intelligent Platform Management Interface (IPMI) protocol; and
  send the list of system device to the firmware, wherein the list of system devices is sent in a response message responsive to the command.

23. The computing device of claim 21, wherein receiving the program code comprises receiving data using a hypermedia representational state transfer (REST) interface, the data expressed using a JavaScript Object Notation (JSON) format based on Open Data Protocol (OData).

24. The computing device of claim 21, wherein receiving the program code comprises receiving a logic script composes according to a defined scripting language.

25. The computing device of claim 21, wherein the system devices in the list comprise one or more of a central processing unit (CPU), a dual in-line memory module (DIMM), or a Peripheral Component Interconnect Express (PCIe) device.

* * * * *